Patented June 16, 1942

2,286,795

UNITED STATES PATENT OFFICE 2,286,795

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application August 22, 1941, Serial No. 407,900

13 Claims. (Cl. 260—205)

This invention relates to new azo compounds and their application to the art of dyeing or coloring. Textile materials such as organic derivatives of cellulose, wool, silk, "Nylon" and "Vinyon" and lacquers composed of cellulose esters, cellulose ethers and vinyl derivatives for example can be colored. Coloration can be effected by dyeing, printing, stenciling, or other suitable methods.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the process of our invention wil be illustrated more particularly in connection with the coloration of cellulose acetate, a material which is espeically adapted to be colored by the nuclear non-sulfonated dye compounds of our invention, it will be clearly understood that the dye compounds of our invention can be used to color other organic derivatives of cellulose such as those just mentioned as well as the other materials named.

It is an object of our invention to provide a new class of azo compounds. Another object of our invention is to provide a process for the direct coloration of organic derivatives of cellulose, wool, silk, "Nylon" and "Vinyon" textile materials. A further object is to provide colored textile materials which are of good fastness to light and washing. A particular object of our invention is to provide a new class of nuclear non-sulfonated azo compounds suitable for the direct coloration of cellulose acetate silk.

The azo compounds of our invention by means of which the above objects are accomplished or made possible consist of the azo compounds having the formula:

R—N=N—B wherein R represents the residue of a member selected from the group consisting of a benzene nucleus, an azobenzene nucleus and a naphthalene nucleus, B represents a benzene nucleus containing a

group in para position to the azo bond, a

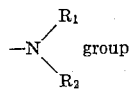

in ortho position to the azo bond and a —SR₃ group in para position to the

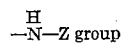

wherein R₁ represents an alkyl group, R₂ represents a member selected from the group consisting of hydrogen and an alkyl group, R₃ represents a member selected from the group consisting of an alkyl group, a cycloalkyl group, an aralkyl group, a short chain unsaturated aliphatic hydrocarbon group, an aryl group and a furyl group and Z represents an acyl group.

While our invention relates broadly to the azo compounds having the above formula it relates more particularly to the zao compounds having the formula:

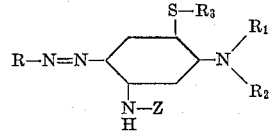

wherein R represents the residue of a member selected from the group consisting of a benzene nucleus, an azobenzene nucleus and a naphthalene nucleus, R₁ represents an alkyl group, R₂ represents a member selected from the group consisting of hydrogen and an alkyl group, R₃ represents a member selected from the group consisting of an alkyl group, a cycloalkyl group, an aralkyl group, a short chain unsaturated aliphatic hydrocarbon group, an aryl group and a furyl group and Z represents an acyl group.

Ordinarily R stands for a benzene nucleus, R₃ for an alkyl group and Z for an alkyl hydrocarbon acyl group especially the aceto group. Often compounds wherein R, R₃ and Z are the groups just stated are advantageous.

The term "alkyl" as used herein and in the claims, unless otherwise indicated, includes both unsubstituted and substituted alkyl groups. Ordinarily the alkyl group will be methyl, ethyl, propyl, butyl, β-hydroxypropyl, β-methoxyethyl, β-sulfoethyl, β,γ-dihydroxypropyl or β-hydroxy-β-ethoxyethyl. Similarly, the term "cycloalkyl" includes, for example, cyclohexyl, cyclopentyl and cycloheptyl. Illustrative of aralkyl may be mentioned benzyl and phenylethyl. The term "furyl" includes, for example, furfuryl, 5-ethylfurfuryl, tetrahydrofurfuryl and 5-β-hydroxyethyltetrahydrofurfuryl. Again vinyl, crotonyl and allyl are illustrative of a short chain unsaturated hydrocarbon group. Finally, the term "acyl" is intended to include groups such as $$-\underset{\underset{O}{\|}}{C}-CH_3; \quad -\underset{\underset{O}{\overset{O}{\|}}}{S}-CH_3; \quad -\underset{\underset{O}{\|}}{C}-OCH_3; \quad -\underset{\underset{O}{\|}}{P}(-OCH_3)_2;$$

$$-\underset{\underset{O}{\|}}{P}(-OC_2H_5)_2; \quad -\underset{\underset{O}{\|}}{C}-NH_2; \quad -\underset{\underset{NH}{\|}}{C}-NH_2;$$

$$-\underset{\underset{O}{\|}}{\overset{H}{C}N}-C_2H_5; \quad -\underset{\underset{O}{\|}}{C}-\underset{\underset{OH}{|}}{CH}-CH_3;$$

and $$-\underset{\underset{S}{\|}}{C}-NH_2$$

for example.

Both sulfonated and non-sulfonated compounds are included within the scope of our invention. The nuclear non-sulfonated compounds have been found to be especially of value for the dyeing of organic derivatives of cellulose and "Nylon" although they likewise possess application for the dyeing of wool and silk. For the dyeing of organic derivatives of cellulose, such as cellulose acetate silk, nuclear non-sulfonated dye compounds wherein R is the residue of a benzene nucleus are generally advantageous.

The nuclear sulfonated compounds have little or no utility for the dyeing of organic derivatives of cellulose but possess application for the dyeing of wool and silk. Preferably when the azo compounds of our invention are to be employed for the coloration of organic derivatives of cellulose they should contain no nuclear carboxylic acid group in either its free acid or salt form. The colors given in the examples and in the tabulation which follows are those which are obtained on the materials named herein.

The azo compounds of our invention can be prepared by diazotizing diazotizable members of the group consisting of an aminobenzene, an aminonaphthalene and an aminoazobenzene and coupling the diazonium compounds obtained with the m-phenylene diamine derivatives indicated hereinbefore.

The following examples illustrate the preparation of the azo compounds of our invention.

*Example 1*

1 gram mole of 1-amino-2,4-dinitro-6-chlorobenzene is diazotized in known fashion and the diazonium solution obtained is poured onto ice and then added to a cold acetic acid solution of 1-gram mole of

[structure: benzene ring with SCH$_3$, N(H)(CH$_2$CHCH$_2$OH with OH), and HN–C(=O)–CH$_3$ substituents]

The coupling reaction which takes place is completed by adding sodium acetate until the reaction mixture is neutral to Congo red paper following which the dye is precipitated by adding water, recovered by filtration, washed with water and dried. The dye compound obtained yields blue shades.

*Example 2*

1 gram mole of 2-amino-3,5-dinitro-6-benzene-sulfonethylamide is diazotized in known fashion and the diazonium solution obtained is poured into water. The yellow diazonium precipitate is recovered by filtration, washed with a solution of urea to remove any nitrous acid present and then the diazonium compound is added to a cold acetic acid solution of 1-gram mole of the coupling component used in Example 1. Coupling and recovery of the dye compound formed can be carried out in accordance with the procedure described in Example 1. The dye compound obtained yields greenish-blue shades.

*Example 3*

1 gram mole of p-nitroaniline is diazotized and the diazonium compound obtained is added to a cold hydrochloric acid solution containing 1-gram mole of

[structure: benzene ring with SCH$_3$, N(CH$_3$)(C$_2$H$_5$), and HN–C(=O)–CH$_3$ substituents]

After completion of the coupling reaction which takes place, the mixture is permitted to stand a few minutes and then made neutral to Congo red paper by the addition of sodium acetate. The dye compound formed is recovered by filtration, washed with water and dried. It yields deep blue-green shades.

*Example 4*

1 gram mole of 1-amino-2-chloro-4-nitrobenzene is diazotized and the diazonium compound obtained is coupled with 1 gram mole of

[structure: benzene ring with CH$_3$, SCH$_3$, N(C$_2$H$_5$)(CH$_2$CH$_2$OH), and HN–S(=O)$_2$–CH$_3$ substituents]

Coupling and recovery of the dye compound formed can be carried out in accordance with the general procedure described in the foregoing examples. The dye compound obtained yields violet colorations.

*Example 5*

1 gram mole of 1-amino-2-hydroxy-4-nitrobenzene is diazotized and the diazonium compound obtained is coupled with 1 gram mole of

[structure: benzene ring with SCH$_2$CH$_2$OH, N(CH$_2$CH$_2$OH)$_2$, and HN–C(=O)–OCH$_3$ substituents]

Coupling and recovery of the dye compound formed can be carried out in accordance with the general procedure described in Examples 1 to 3. The dye compound obtained yields pinkish-violet shades.

*Example 6*

1 gram mole of 2-amino-4-nitrophenylmethyl-sulfone is diazotized and the diazonium compound is coupled with 1 gram mole of

[structure: benzene ring with SCH$_2$CH$_2$OCH$_3$, N(C$_2$H$_5$)(CH$_2$CHCH$_2$OCH$_3$ with OH), and HN–P(=O)(OCH$_3$)$_2$ substituents]

Coupling and recovery of the dye compound formed can be carried out in accordance with the procedure described in Example 3. The dye compound obtained yields blue shades.

*Example 7*

1 gram mole of 2-amino-5-nitrophenylmethyl-ketone is diazotized and the diazonium compound obtained is coupled with 1 gram mole of

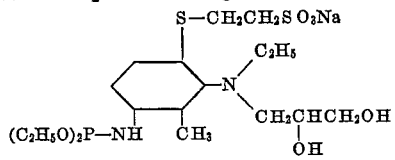

Coupling may be carried out in accordance with the procedure set forth in Example 3. The dye compound formed can be recovered from the reaction mixture by precipitating it therefrom with sodium chloride. The dye compound obtained yields violet shades.

*Example 8*

1 gram mole of diazotized 1-amino-2,4-dinitrobenzene is coupled with 1 gram mole of

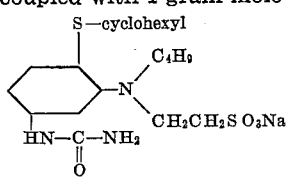

The dye compound obtained in accordance with the procedure set forth in Example 3 yields blue shades.

1 gram mole of

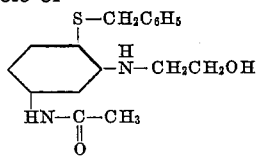

can be substituted for the coupling component of the example to obtain a dye compound which yields blue shades.

*Example 9*

1 gram mole of 1-amino-2,4-dinitro-6-chlorobenzene is diazotized and the diazonium compound obtained is coupled with 1 gram mole of

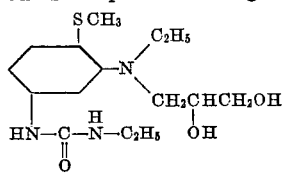

Coupling and recovery of the dye compound formed can be carried out in accordance with the general procedure described in Examples 1 to 3. The dye compound obtained yields greenish-blue shades.

*Example 10*

1 gram mole of 1-amino-2,4-dinitro-6-iodobenzene is diazotized and the diazonium compound obtained is coupled with 1 gram mole of

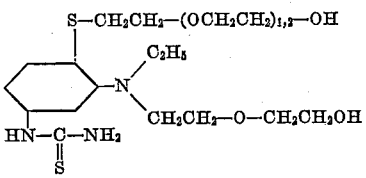

Coupling and recovery of the dye compound formed can be carried out in accordance with the procedure described in Examples 1 to 3. The dye compound obtained yields blue-green shades.

*Example 11*

1 gram mole of p-aminoacetophenone is diazotized and the diazonium compound obtained is coupled with 1 gram mole of

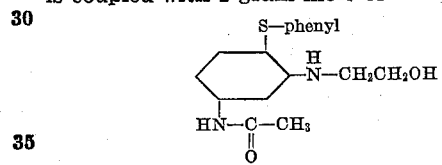

Coupling and recovery of the dye compound formed can be carried out in accordance with the procedure described in Examples 1 to 3. The dye compound obtained yields orange-red shades.

The following tabulation further illustrates the compounds included within the scope of our invention together with the colors they yield on the materials named herein. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 11 inclusive.

| Amine | Coupling component | Color |
|---|---|---|
| 2-amino-5-nitrophenylmethylsulfone | (1) $S\,C_2H_5$ / ring / $-N(CH_2CH_2OH)_2$ / $HN-C-NH_2$ / $\parallel$ / $NH$ | Reddish-blue. |
| Do | (2) $S\,CH_3$ / ring / $-N(CH_2CHCH_3)$ / $OH$ / $HN-C-CH_3$ / $\parallel$ / $O$ | Do. |
| Do | (3) $S\,CH_2CH_2SO_3NH_4$ / ring / $H$ / $N$ / $CH_2CH_2CH_2OH$ / $HN-C-CHCH_3$ / $\parallel$ $\mid$ / $O\ \ OH$ | Do. |

| Amine | Coupling component | | Color |
|---|---|---|---|
| 2-amino-5-nitrophylmethylsulfone | (4) | structure: S—CH₂CH=CH, HN—C(=O)—CH₃, N—H, CH₂CH₂OH | Reddish-blue. |
| Do | (5) | structure: S—tetrahydrofurfuryl, HN—C(=O)—CH₂CH₃, N—H, CH₂CH₂CH₃ | Do. |
| Do | (6) | structure: S—phenyl, HN—C(=O)—CH₃, N—H, CH₂—C(CH₂OH)(CH₂OH)(CH₂OH) | Do. |
| α-naphthylamine | 1 to 6 above | | Orange |
| p-Aminoazobenzene | do | | Rubine. |
| 4′-nitrobenzeneazo-2-methyl-4-amino-5-methoxybenzene | do | | Navy-blue. |
| 4′-nitrobenzeneazo-2-acetamino-4-amino-5-methoxybenzene | do | | Do. |
| 1-amino-5-hydroxynaphthalene | do | | Red-blue. |
| 1-amino-2,4-dinitronaphthalene | do | | Green-blue. |
| 1-amino-2-methoxy-4-nitrobenzene | do | | Rubine. |
| 1-amino-2-propoxy-4-nitrobenzene | do | | Do. |
| 1-amino-4-nitronaphthalene | do | | Violet. |
| 1-amino-8-hydroxynaphthalene | do | | Red-blue. |

It will be understood that the examples given are intended to be illustrative and not limitative of our invention. Thus, any of the coupling compounds disclosed herein can be coupled with any of the diazonium compounds indicated herein, to yield dye compounds of the invention.

Sulfonated amines which can be diazotized and the diazonium compounds obtained coupled with any of the coupling components shown herein to obtain dye compounds of the invention include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-hydroxy-7-sulfonic naphthalene, metanilic acid, 1-amino-2-sulfonic-4-nitrobenzene, 1-amino-2,4-disulfonic benzene and 1-amino-2-chloro-4-sulfonic benzene.

In order that the preparation of the azo compounds disclosed herein may be entirely clear the preparation of the coupling components employed in their manufacture is indicated diagrammatically by the following formulas illustrating two methods of preparation.

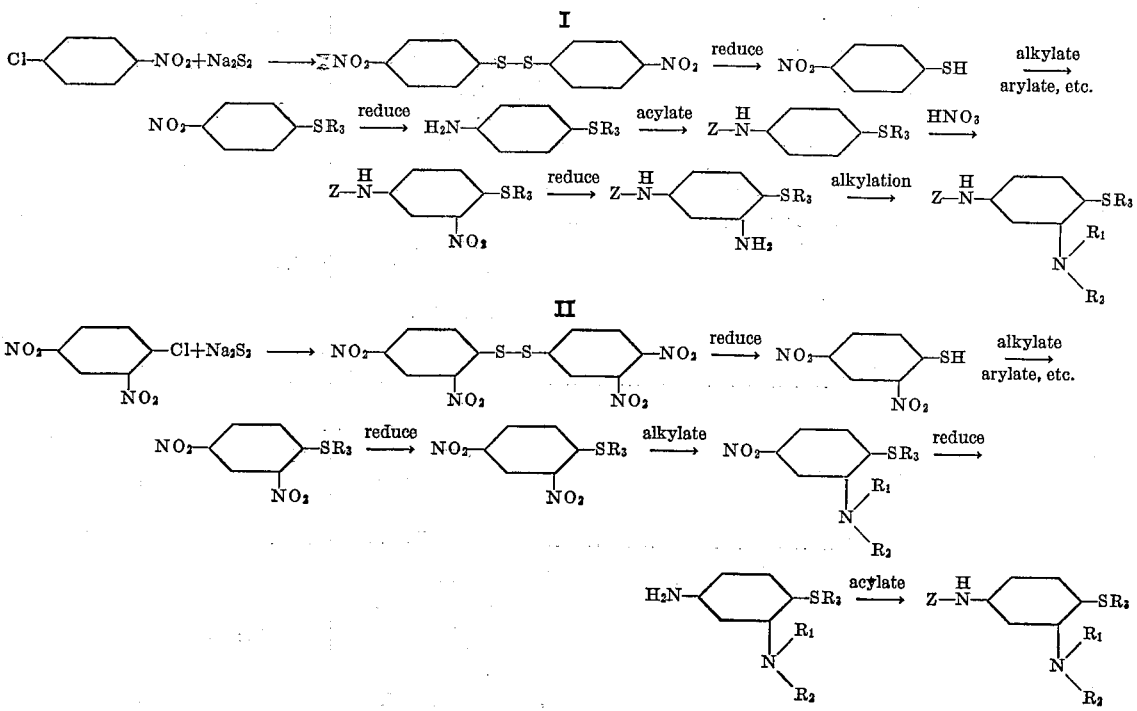

Turning now to the method designated I the reduction operation indicated in step 2 can be carried out using ammonium or sodium sulfide. In the operation introducing the member $R_3$ the chemical treating agent can be, for example, methyl iodide, methyl sulfate, allyl bromide, p-nitrochlorbenzene, benzyl chloride, cyclohexylchloride, tetrahydrofurfuryl bromide and ethylene chlorhydrin. The reducing operation preceding the acylation step can be carried out in a pressure vessel employing hydrogen and a finely divided nickel catalyst, such as "Raney" nickel, as can the reduction immediately following the nitration operation. Acylation agents that can be employed in the acylation step include, for example, acetic anhydride, propionic anhydride, butyric anhydride, cyanamide, the acid chloride of methane sulfonic acid, methyl lactate and methylchlorcarbonate. The final alkylation step may be carried out using alkylation methods well known to the art.

The reactions set forth in Method II can be carried out in the same manner as indicated for the corresponding reactions in Method I. The members $R_1$, $R_2$, $R_3$ and $Z$ appearing in the above formulas have the same meaning as previously assigned to them.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dye is to be effected, a temperature approximately 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in our Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note, that while colors yielded by the dye compounds have been given primarily with reference to cellulose acetate silk, generally similar colors are ordinarily obtained on the other materials.

We claim:

1. The azo compounds having the formula:

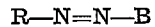

wherein R represents the residue of a member selected from the group consisting of a benzene nucleus, an azobenzene nucleus and a naphthalene nucleus, B represents a benzene nucleus containing a

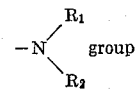

in para position to the azo bond, a

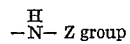

in ortho position to the azo bond and a —$SR_3$ group in para position to the

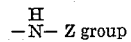

wherein $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

2. The azo compounds having the formula:

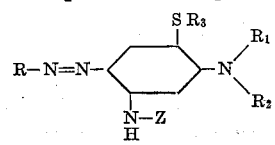

wherein R represents the residue of a member selected from the group consisting of a benzene nucleus, an azobenzene nucleus and a naphthalene nucleus, $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

3. The azo compounds having the formula:

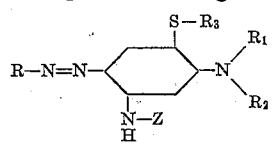

wherein R represents the residue of a benzene nucleus, $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

4. The azo compounds having the formula:

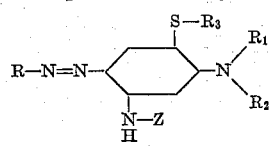

wherein R represents the residue of a benzene nucleus, $R_1$ represents an alkyl group, $R_2$ represents a member selected from the group consisting of hydrogen and an alkyl group, $R_3$ represents an alkyl group and Z represents an alkyl hydrocarbon acyl group.

5. The azo compounds having the formula:

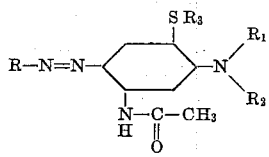

wherein R represents the residue of a benzene nucleus, $R_1$ represents an alkyl group, $R_2$ represents a member selected from the group consisting of hydrogen and an alkyl group and $R_3$ represents an alkyl group.

6. The azo compound having the formula:

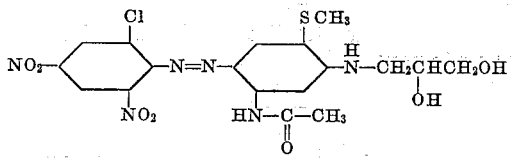

7. The azo compound having the formula:

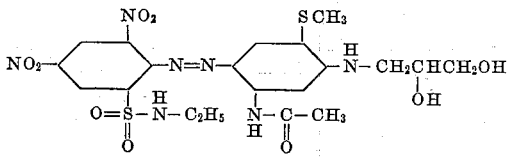

8. The azo compound having the formula:

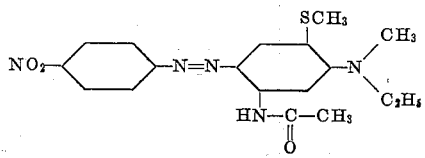

9. Textile material colored with an azo dye compound having the formula:

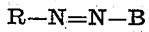

wherein R represents the residue of a member selected from the group consisting of a benzene nucleus, an azobenzene nucleus and a naphthalene nucleus, B represents a benzene nucleus containing a

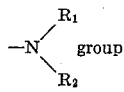

in para position to the azo bond, a

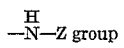

in ortho position to the azo bond and a $-SR_3$ group in para position to the

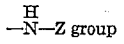

wherein $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

10. Textile material colored with an azo dye compound having the formula:

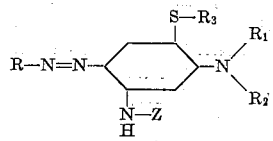

wherein R represents the residue of a benzene nucleus, $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

11. A cellulose acetate colored with a nuclear non-sulfonated azo dye compound having the formula:

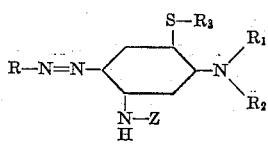

wherein R represents the residue of a member selected from the group consisting of a benzene nucleus, an azobenzene nucleus and a naphthalene nucleus, $R_1$ represents an alkyl group, $R_2$ represents a member selected from the group consisting of hydrogen and an alkyl group, $R_3$ represents a member selected from the group consisting of an alkyl group, a cycloalkyl group, an aralkyl group, a short chain unsaturated aliphatic hydrocarbon group, an aryl group and a furyl group and Z represents an acyl group.

12. A cellulose acetate colored with a nuclear non-sulfonated azo dye compound having the formula:

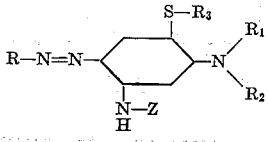

wherein R represents the residue of a benzene nucleus, $R_1$ represents an alkyl group, $R_2$ represents a member selected from the group consisting of hydrogen and an alkyl group, $R_2$ represents a member selected from the group consisting of an alkyl group, a cycloalkyl group, an aralkyl group, a short chain unsaturated aliphatic hydrocarbon group, an aryl group and a furyl group and Z represents an acyl group.

13. A cellulose acetate colored with a nuclear non-sulfonated azo dye compound having the formula:

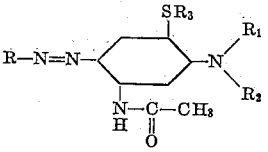

wherein R represents the residue of a benzene nucleus, $R_1$ represents an alkyl group, $R_2$ represents a member selected from the group consisting of hydrogen and an alkyl group and $R_3$ represents an alkyl group.

JOSEPH B. DICKEY.
JAMES G. McNALLY.